US010351200B2

(12) United States Patent
Moore

(10) Patent No.: US 10,351,200 B2
(45) Date of Patent: Jul. 16, 2019

(54) BOX BEAM BICYCLE STRUCTURE

(71) Applicant: James D. Moore, Tujunga, CA (US)

(72) Inventor: James D. Moore, Tujunga, CA (US)

( * ) Notice: Subject to any disclaimer, the term of this patent is extended or adjusted under 35 U.S.C. 154(b) by 247 days.

(21) Appl. No.: 15/350,066

(22) Filed: Nov. 13, 2016

(65) Prior Publication Data

US 2017/0327175 A1    Nov. 16, 2017

Related U.S. Application Data

(63) Continuation-in-part of application No. 15/153,424, filed on May 12, 2016, now abandoned.

(51) Int. Cl.
| | |
|---|---|
| *B60K 5/12* | (2006.01) |
| *B62K 3/10* | (2006.01) |
| *B62K 19/08* | (2006.01) |
| *B62K 19/16* | (2006.01) |
| *B62K 19/20* | (2006.01) |
| *B62K 19/26* | (2006.01) |
| *B62K 19/22* | (2006.01) |
| *B62K 19/04* | (2006.01) |

(52) U.S. Cl.
CPC ............... *B62K 3/10* (2013.01); *B62K 19/08* (2013.01); *B60Y 2304/03* (2013.01); *B62K 19/04* (2013.01); *B62K 19/16* (2013.01); *B62K 19/20* (2013.01); *B62K 19/22* (2013.01); *B62K 19/26* (2013.01)

(58) Field of Classification Search
CPC ................................. B62K 3/10; B62K 19/08
USPC ..................................................... 280/281.1
See application file for complete search history.

(56) References Cited

U.S. PATENT DOCUMENTS

| | | | | |
|---|---|---|---|---|
| 2,493,037 | A | * | 1/1950 | Simon ................... B62K 19/08 280/288.3 |
| 2,855,200 | A | | 6/1957 | Douglas et al. |
| 2,827,306 | A | * | 3/1958 | Roder .................. B62K 19/08 280/288.3 |
| 3,375,024 | A | | 2/1966 | George |
| 3,966,230 | A | * | 6/1976 | Nicol .................... B62K 19/18 280/281.1 |
| 4,139,072 | A | * | 2/1979 | Dawson ............... B60K 15/063 180/219 |
| 4,230,332 | A | | 10/1980 | Porsche |
| 4,548,422 | A | | 10/1985 | Michel et al. |
| 4,613,146 | A | | 9/1986 | Sharp et al. |
| 5,255,932 | A | | 10/1993 | Moore |
| 5,470,092 | A | | 11/1995 | Fardy |
| 2003/0189308 | A1 | * | 10/2003 | Wegzyn ................ B62K 19/08 280/281.1 |

(Continued)

*Primary Examiner* — Tony H Winner
(74) *Attorney, Agent, or Firm* — Patent Law Inc

(57) ABSTRACT

A box beam bicycle structure (BBBS) having a box section, a right triangular section and a left triangular section. The right and left triangular sections are either integral with the box structure, or the triangular sections are attached to the box structure by riveting, bonding or welding. The box structure is preferably made of a sheet material and the parts that comprise the box structure are attached together by riveting, bonding or welding. The BBBS interfaces with bicycle components to function as a lightweight, strong bicycle frame. Additionally, the BBBS can be manufactured as a one-piece design, or can utilize a hybrid construction design with an internal structure and reinforcing members at areas of high stress.

21 Claims, 11 Drawing Sheets

(56) References Cited

U.S. PATENT DOCUMENTS

| | | | | |
|---|---|---|---|---|
| 2012/0013101 A1* | 1/2012 | Huang | ................ | B62K 3/04 |
| | | | | 280/287 |
| 2012/0019019 A1* | 1/2012 | Meredith | ............. | B62K 19/08 |
| | | | | 296/21 |
| 2015/0048591 A1* | 2/2015 | Choi | ................ | B21D 53/86 |
| | | | | 280/288.3 |
| 2016/0039489 A1* | 2/2016 | Platz | ................ | B62K 19/08 |
| | | | | 280/279 |
| 2017/0036735 A1* | 2/2017 | Douglas | ............ | B62M 6/55 |

* cited by examiner

BOX BEAM BICYCLE STRUCTURE

TECHNICAL FIELD

The invention generally pertains to bicycles, and more particularly to a box beam structure that functions as a frame for various types of bicycles.

BACKGROUND ART

Traveling from one location to another is one of the most important abilities of modern humans. For a large part of mankind's history, people were born, lived and died in a single, usually small, geographical area. The reason for this was, and in some parts of the world still is, because of a lack of transportation. While the development of the automobile is responsible for people having the ability to travel, a bicycle is also a very important contributing factor to the ability for individual travel. For many people throughout the world, a bicycle is preferable over an automobile or other vehicle. Some people simply can not afford an automobile while others embrace the health benefits and lack of any environmental damage caused by a bicycle. Bicycles have also become popular as means of exercise and also used for sporting events such as racing or BMX competition.

A typical bicycle is designed with two wheels/tires that are attached to a frame. The most common appearance of a bicycle frame is multiple inter-connected tubes usually made of metal. This type of frame design has long been in use, although there are negative aspects and problems inherent to the design. One of the problems is that a tube frame can experience a significant horizontal or out of plane flexing which is strongly felt by a person riding the bicycle. Another problem is that the use of tubes, which are limited in diameter, can produce a frame with limited structural stiffness and integrity.

What is needed is a bicycle frame that has greater torsional stiffness and fatigue life with approximately comparable vertical or in-plane stiffness as conventional tube frames. A beneficial alternative to a tube frame is a box beam frame which has equal mass and significantly greater structural benefits. A box beam frame does not experience the same level of flexing a tube frame. Further, the structural components of a box beam frame made of sheet material are low in cost, higher in strength, available in more alloys and are easily cut and formed. The components are readily attached together by strong and secure attachment means such as rivets, bonding or welding.

A box beam frame would offer solutions to many of the problems associated with a conventional tube frame, without presenting any new problems or deficiencies. The design is readily adaptable to any frame type including road, track, BMX, mountain and recreational use.

A search of the prior art did not disclose any literature or patents that read directly on the claims of the instant invention. However, the following U.S. patents are considered related:

The Re. 33,295 patent discloses a bicycle frame with a structural support that provided by a formed, stressed skin in conjunction with integral tubes and stiffening ribs. A body is formed which joins the front fork, pedal axle, seat post and rear wheel axle. The body is visually solid from the side with two open triangles of a conventional tube frame being filled in, and is airfoil shaped from the top. All control cables, and a cargo compartment, are contained within the frame.

The U.S. Pat. No. 5,255,932 discloses a superefficient bicycle frame having a plurality of dual tapered rectangular or square cross section frame members. A torsional-bending section modulus of a member is changed by providing a dual taper to the cross section of the frame members so that larger cross sections are used at points of greatest stress and smaller cross sections are used at points of lower stress. The method of manufacture is to cut various two dimensional shapes from sheet stock which are bent along nonparallel shapes from sheet stock which are bent along nonparallel bend lines to form the various members.

The U.S. Pat. No. 4,613,146 discloses a monocoque bicycle frame having a body having right and left side panels, top and bottom panels, and a bifurcated rearward portion defined by the panels and a rear wheel well insert. The body panels and insert enclose a continuous internal space which is compression loaded or tensile pre-stressed with a rigid foam plastic for increased torsional rigidity and resistance to impact distortion. A bicycle's pedal sprocket and chain are both external to the hollow frame so as to not interrupt the continuity of the body cavity and its compression loading, and also enabling the body to have minimal weight and an optimum aerodynamic configuration. The frame is diamond-shaped in side profile thus enabling the monocoque to be constructed as a pair of triangles connected back-to-back both torsionally and against vertical loading.

Comparing the instant invention with the U.S. Pat. No. 4,613,146 prior art patent:

1) Racing bicycle frames must be less than 3.5 pounds to compete. Even the lightest structural foam is 2 pounds per cubic foot so the minimum weight that would be added in the prior art design would be a pound or more.

2) The prior art design does not take advantage of lightening holes used in formers on aircraft; the instant invention does. This method results in an obvious weight advantage.

3) The prior art connecting flange is impossible to form from high-strength material, thus the flange would have to be formed of soft aluminum capable of being heat treated. Therefore, the number of materials which could be used is greatly limited, unlike the instant invention.

The U.S. Pat. No. 4,548,422 discloses a bicycle frame having a shell structure consisting of two assembled shells. Each shell has the axis of a passage of a seat shaft combined with the axis of a housing of a crank gear in the plane of assembly.

For background purposes and indicative of the art to which the invention relates, reference may be made to the following remaining patents found in the patent search.

| PATENT NO. | INVENTOR | ISSUED | PATENT NO. | INVENTOR | ISSUED |
| --- | --- | --- | --- | --- | --- |
| Re. 33,295 | Trimble | Aug. 14, 1990 | 4,230,332 | Porsche | Feb. 14, 1997 |
| 5,255,932 | Moore | Oct. 26, 1993 | 3,375,024 | George | Feb. 8, 1966 |
| 4,613,146 | Sharp, et al | Sep. 23, 1986 | 2,855,20 | Douglas, et al | Jun. 20, 1957 |
| 4,548,422 | Michel, et al | Oct. 22, 1985 | 5,470,092 | Fardy | Nov. 28, 1995 |

DISCLOSURE OF THE INVENTION

In a basic design, the box beam bicycle structure (BBBS) is comprised of a front box section with a right side, a left side, an upper section/closeout, a lower section/closeout, a front end and a rear end; a right rear triangular section with an outer surface, an inner surface, an upper edge, a lower edge; connected to seat tube, the rear dropout and front box section; and a left rear triangular section with an outer surface, an inner surface, an upper edge, a lower edge, a front end and a rear end connected to a seat tube, rear dropout and front box section. The box section and the two triangular sections can either be integral, or the two rear triangular sections can be attached to the seat tube and front box section by riveting, bonding or welding. The sides, sections and ends of the box section can also be attached together by riveting, bonding or welding. There are channels and openings that facilitate the interfacing of bicycle components including a head tube, a lower bracket, a right dropout and a left dropout. The BBBS works in combination with the bicycle components to function as a frame for a bicycle.

In an alternate design, flanges are utilized to allow the riveting, bonding or welding of the BBBS various parts together. In both designs, openings can be utilized for weight reduction, and a core material can be placed within the box section to increase structural integrity and to reduce vibrations that can be felt through the BBBS. Additionally, gussets can be placed at locations of higher stress.

In other alternate designs, the BBBS can be manufactured as a one-piece design, or the BBBS can be made in a hybrid construction design using fiber reinforced polymer, aluminum tubing, an alloy, carbon, fiberglass or honeycomb material, or a combination thereof, with reinforcing members at areas of high stress.

In view of the above disclosure, the primary object of the invention is to produce a box beam bicycle structure that functions as a modem, state-of-the-art bicycle frame.

In addition to the primary object, it is also an object of the invention to produce a box beam bicycle structure that:
  can be used with any type of bicycle,
  is lightweight,
  is significantly less flexible than tube-structure bicycle frames,
  is easy to use,
  can be made of more alloys and other materials than a tube frame,
  can be made in various sizes,
  can be used in competitive bicycling events, and
  is cost effective from both a manufacturer's and consumer's point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
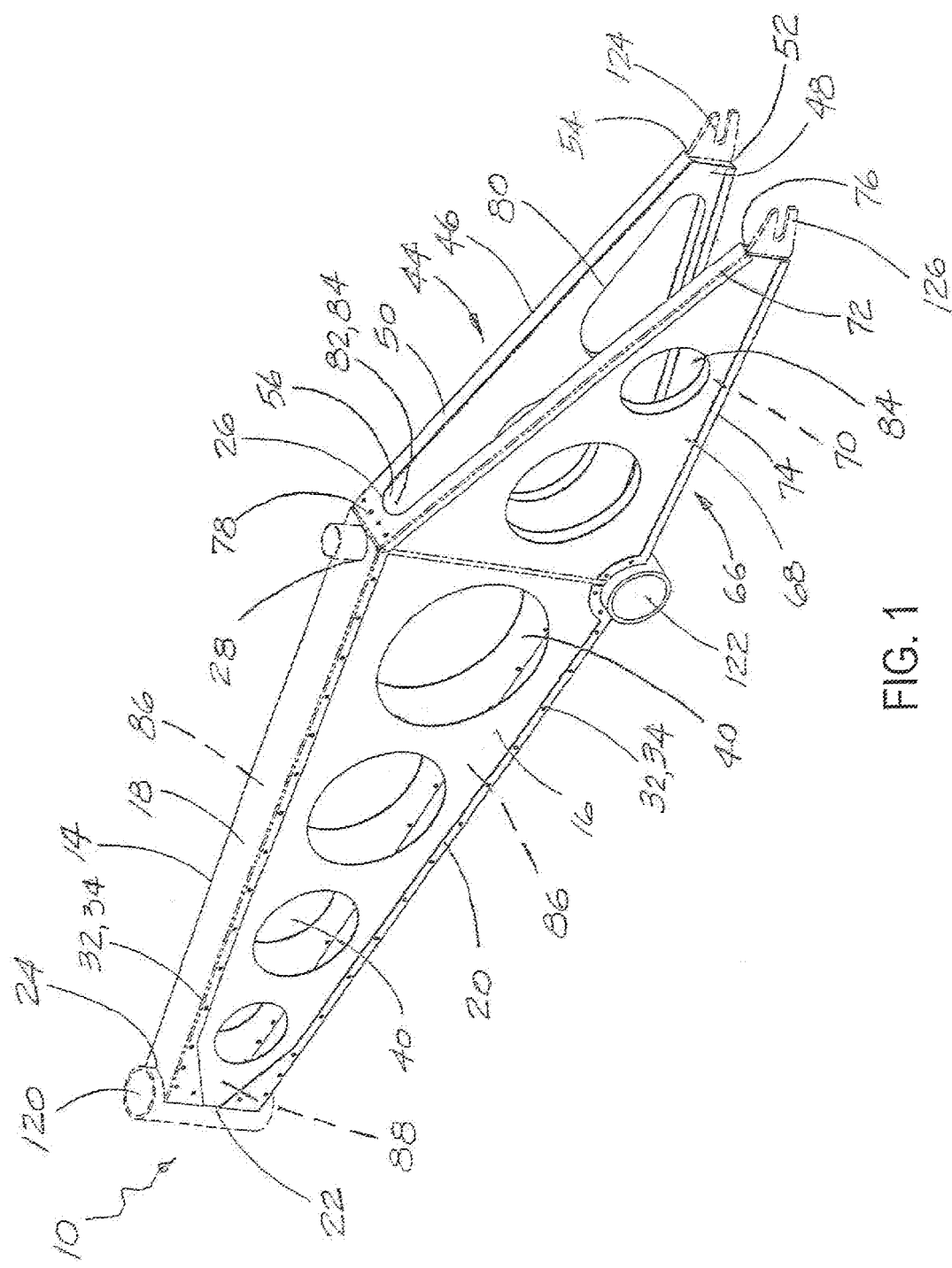
FIG. 1 is an orthographic side view of a box beam bicycle structure (BBBS) utilizing an attachment means comprising riveting.

The best mode for carrying out the invention is presented in terms that disclose a preferred embodiment with multiple design configurations of a box beam bicycle structure (BBBS). One of the most important components of a bicycle is the frame. The frame is a major contributor to the experience of riding a bicycle.

Typically, a bicycle frame is constructed from multiple metal tubes that are welded together. While functionality adequate, a tube frame has limited structural integrity and can be prone to vibrations that are transferred to, and felt by, a rider of a bicycle. The BBBS 10, as shown in FIGS. 1-11, functions as a bicycle frame with improved structural integrity and that reduces the amount of vibrations.

There are multiple main inventive concepts/improvements to the BBBS 10: first is the design of the BBBS 10, second is the preferred use of a sheet material to construct the BBBS 10, and third is the manufacturing process which utilizes riveting, bonding or welding together of the various components of the BBBS 10.

As shown in FIGS. 1-11, the BBBS 10 is comprised of three major elements: a box structure 12, a right triangular section 44, and a left triangular section 66. The box structure can be either a single-wall or double-wall construction.

The box structure 12, as shown in FIGS. 1-4, 6 and 8, includes a right side section 14, a left side section 16, an upper section 18, a lower section 20, a front end 22 having a vertical semi-circular channel 24, and a rear end 26 having a horizontal semi-circular channel 28. The box structure 12 is substantially rectangular shaped, with the upper section 18 tapering downward toward the front end 22, and the lower section 20 tapering upward toward the front end 22.

The right triangular section 44, as shown in FIGS. 1-4, includes an outer surface 46, an inner surface 48, an upper edge 50, a lower edge 52, a front end 54, and a rear end 56. The right triangular section 44 extends rearward and slightly flares outward from the rear end 24 of the box structure 12, with the triangular section's upper edge 50 tapering downward, and the lower edge 52 tapering upward or downward.

The left triangular section 66, as shown in FIGS. 1-4, is essentially a replica of the right triangular section 44 and also includes an outer surface 68, an inner surface 70, and upper edge 72, a lower edge 74, a front end 76, and a rear end 78. The left triangular section 66 extends rearward and slightly flares outward from the rear end 26 of the box structure 12, with the triangular section's upper edge 72 tapering downward, and the lower edge 74 tapering upward or downward. The two triangular sections 44,66 have a space between them, and at a location where the respective front ends 54,76 of the triangular sections interface with the rear end 26 of the box structures 12, a vertical U-shaped channel 82, as shown in FIGS. 1-4, is formed.

As shown in FIGS. 1-4, the vertical semi-circular channel 24 at the box structure's front end 22 interfaces with a bicycle head tube 120, the horizontal semi-circular channel 28 located on the lower section 20 adjacent the box structure's rear end 26 interfaces with a bicycle lower/seat bracket 122. The right triangular section's rear end 56 interfaces with a bicycle right dropout 124, and the left triangular section's rear end 78 interfaces with a bicycle left dropout 126. In combination with the interfacing of the bicycle components, the BBBS 10 functions as a frame for a bicycle.

The BBBS 10 is made of a material selected from the group consisting of a sheet material, carbon fiber, fiberglass, plastic or a composite material. The sheet material can be aluminum alloy, a metal matrix composite, titanium, a fiber reinforced polymer, a ferrous alloy, magnesium alloy, or a honeycomb material. The multiple sections that comprise the box structure 12 are attached together by an attachment means 32 that consists of riveting 34, bonding 36 or welding 38.

Figure 2:
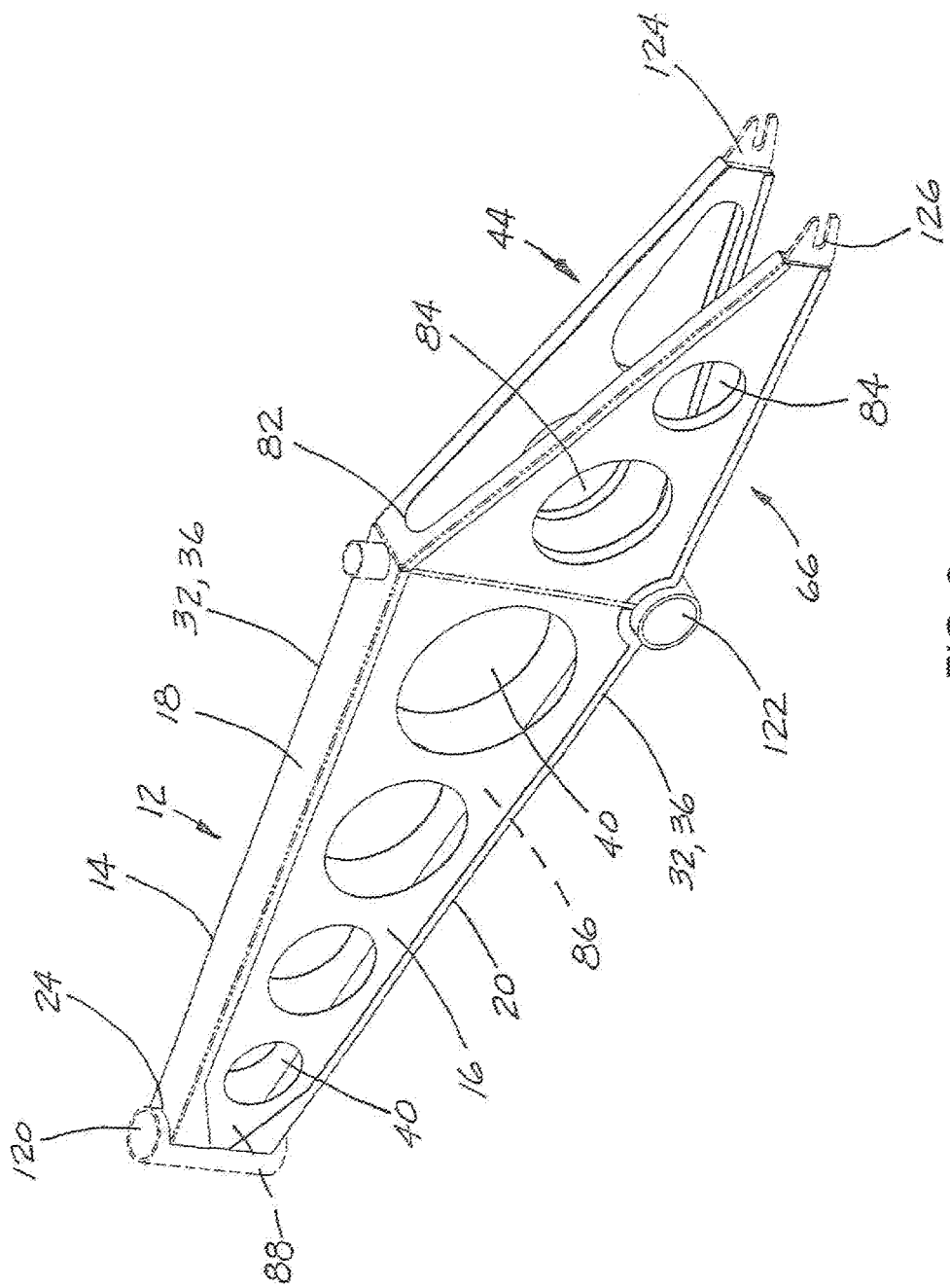
FIG. 2 is an orthographic side view of the BBBS utilizing an attachment means comprising bonding.
Figure 3:
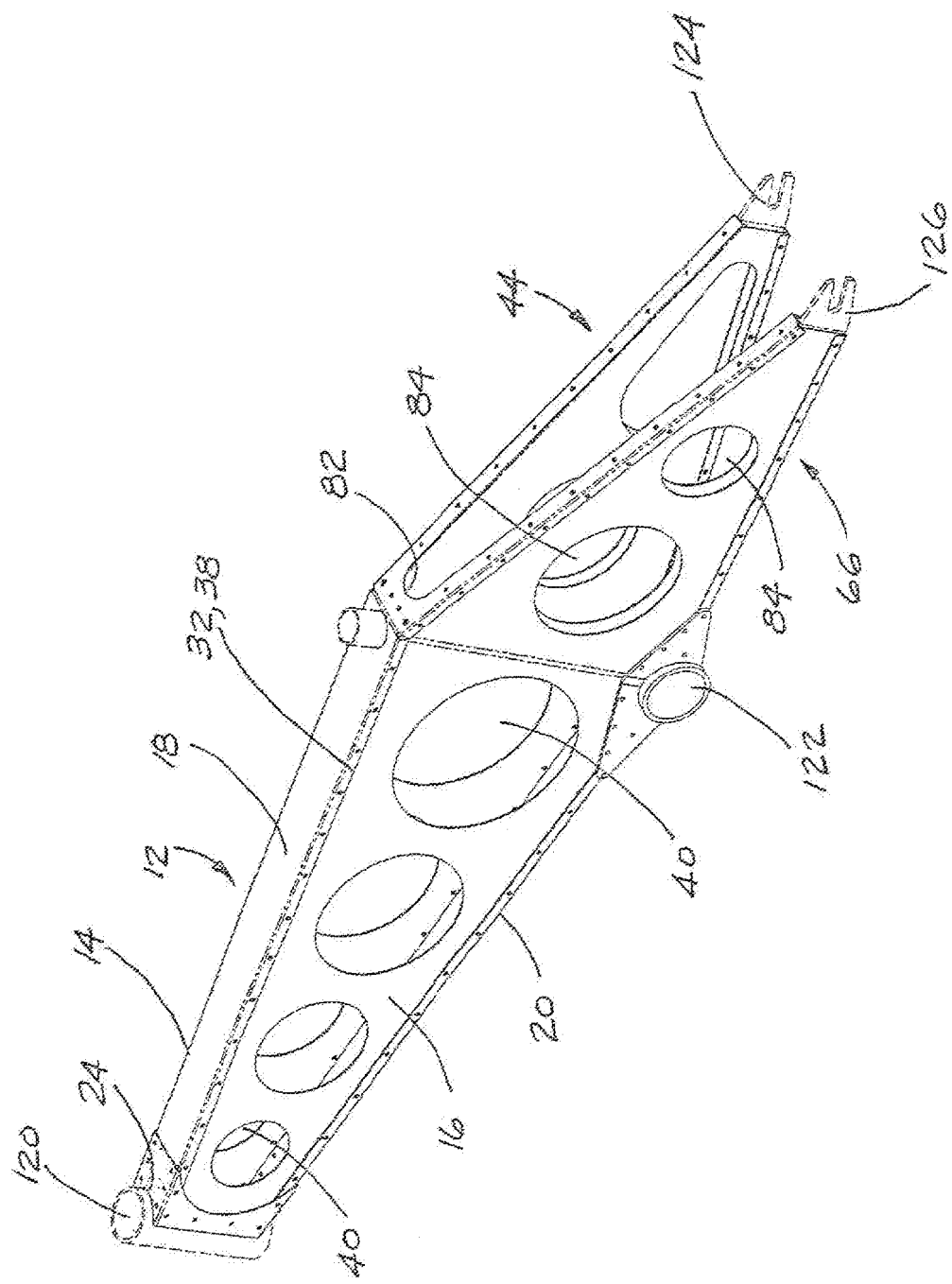
FIG. 3 is an orthographic side view of the BBBS utilizing an attachment means comprising welding.
Figure 4:
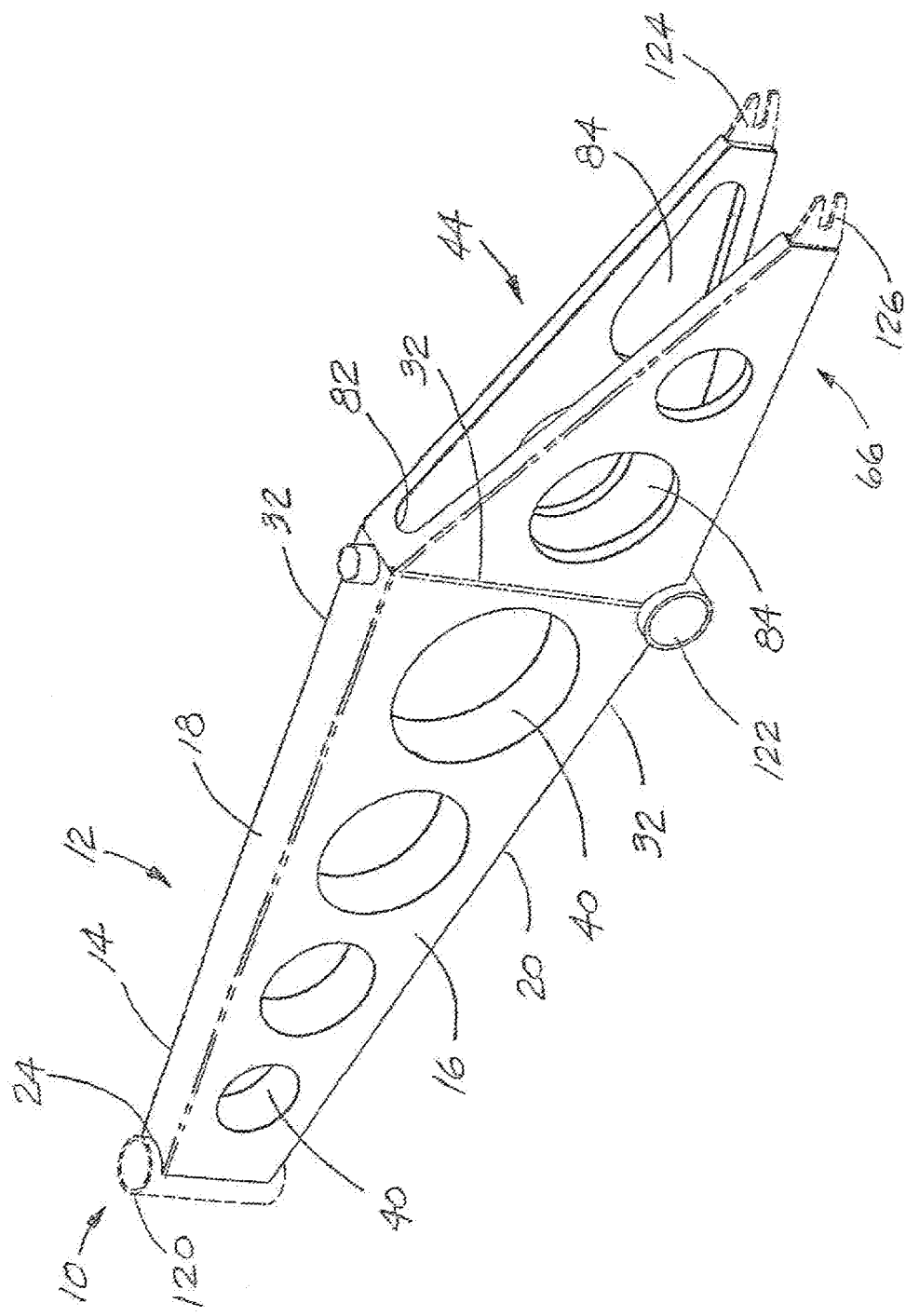
FIG. 4 is an orthographic side view of the BBBS showing two triangular sections that are attached to a box structure.

The box structure 12 and the two triangular sections 44,66 can be either integrally attached, as shown in FIGS. 1-3, or the triangular sections 44,66 can be attached to the box structure 12, as shown in FIG. 4, by the attachment means 32 consisting of riveting 34, bonding 36 or welding 38. The use of these three attachment means for a box structure bicycle frame is one of the inventive elements that significantly differentiates the BBBS 10 from prior art bicycle frames. It is important to note the capability of utilizing a weld-able sheet material that is riveted to, or riveted and bonded to, other not readily weld-able material(s). This also a main inventive concept of the BBBS 10.

To add to the functional capability of the BBBS 10, at least one opening 40 and 84, as shown in FIGS. 1-5, can be placed on either, both, or all of the box structure 12, the right triangular section 44 and/or the left triangular section 66. The at least one opening 40 and 84 can be any geometric or non-geometric shape, and is utilized to provide weight reduction to the BBBS 10. Additionally, a chain slot 80, as shown in FIG. 1, can be placed on either triangular section 44,66.

As shown in FIGS. 1 and 2, located within the box structure 12 can be a quantity of core material 86 that increases the rigidity of the BBBS 10. The core material is preferably a lightweight bondable material such as a honeycomb material, rigid foam, a composite fiber material, or balsa wood.

In areas/locations of higher stress, such as the interfaces of the head tube bracket, seat tube or lower bracket, at least one gusset 88, as shown in FIG. 2, can be added to provide additional strength, stiffness and structural integrity. Additionally, as shown in FIG. 4, the head tube 120, lower bracket 122 and rear drop-outs 124,126 can be welded or braised onto the BBBS 10.

Figure 5:
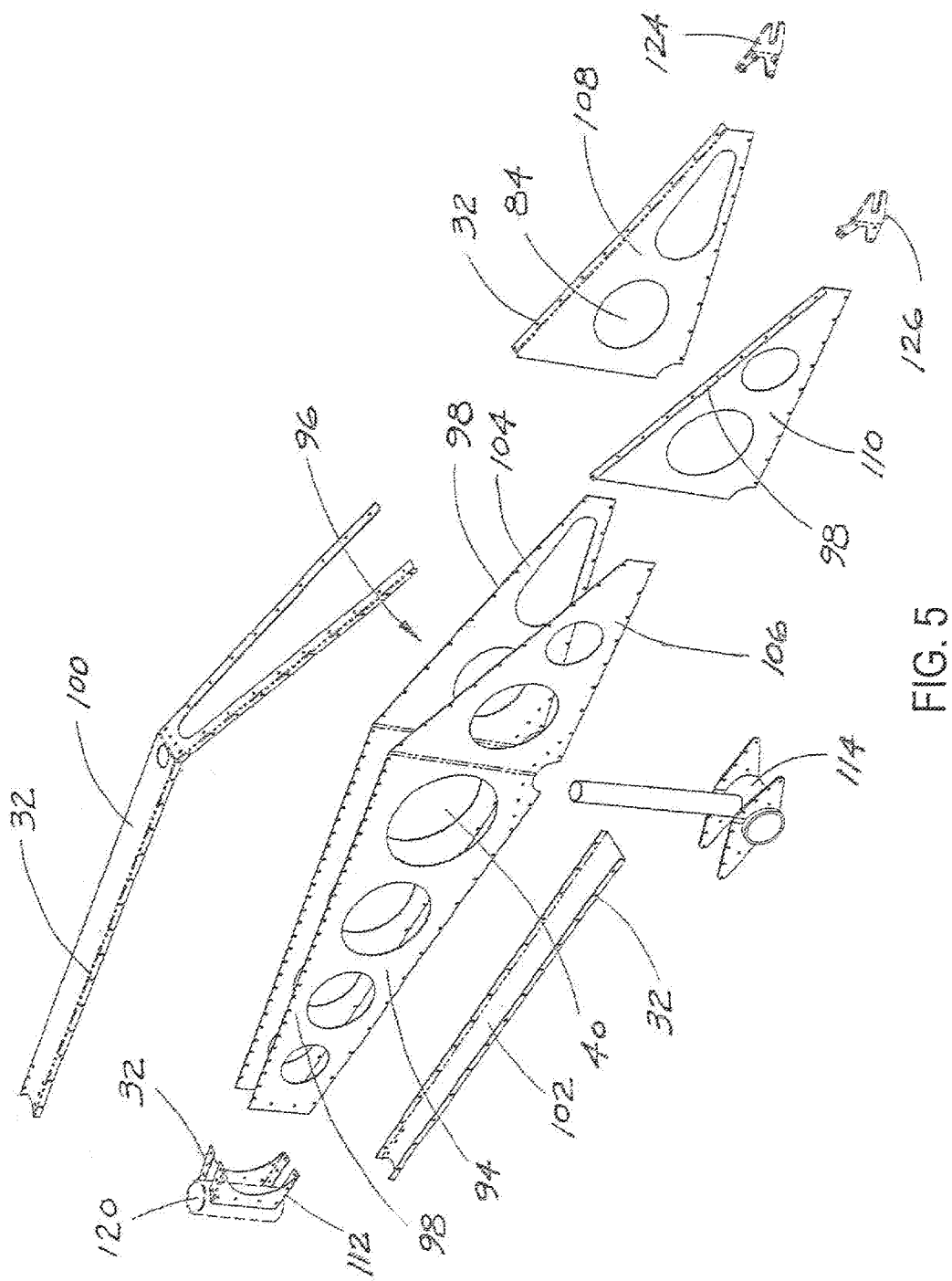
FIG. 5 is an exploded orthographic side view of an alternate design of the BBBS.
Figure 6:
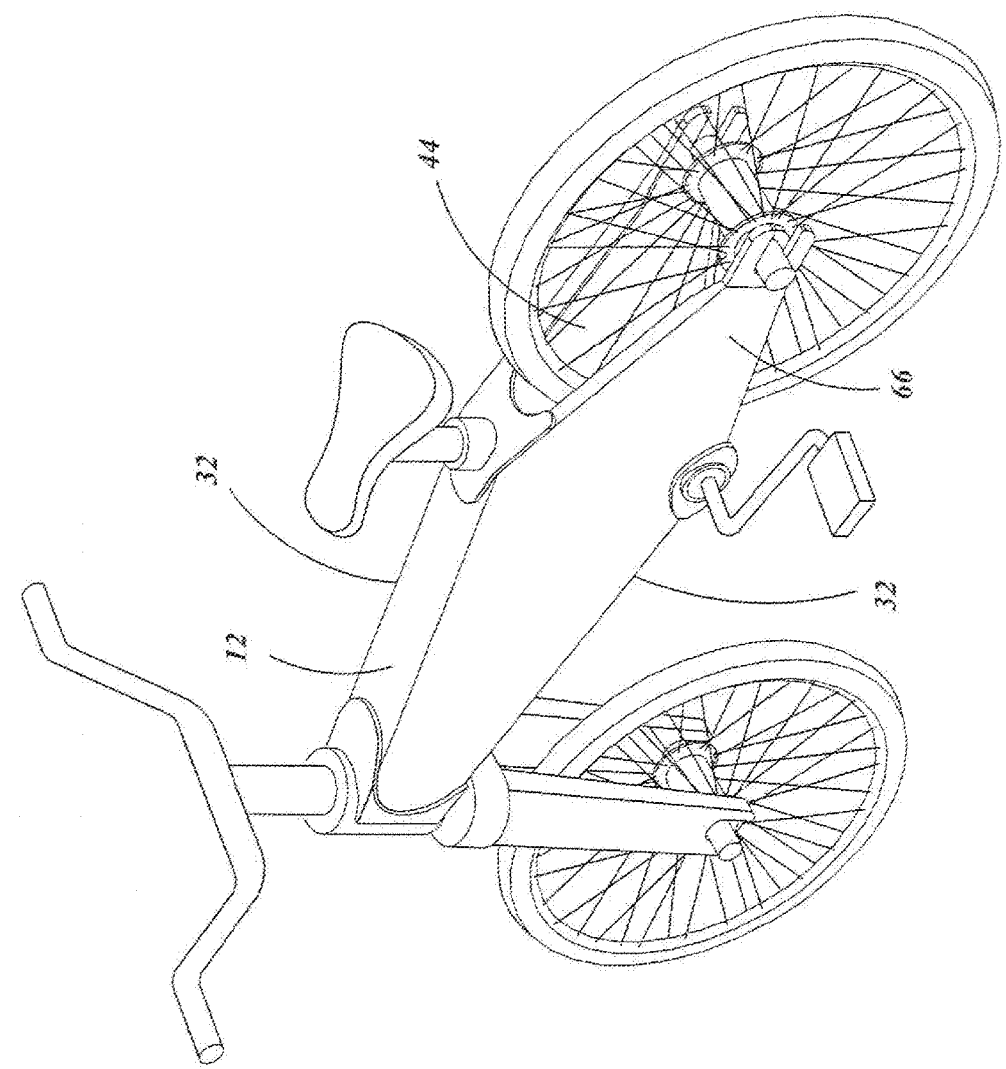
FIG. 6 is an orthographic side view of the BBBS in place and functioning as a frame for a bicycle.

An alternate design of the preferred embodiment of the BBBS 10 comprises a geometric structure 92 with a right section 94 and a left section 96, as shown in FIG. 5. The right section 94 comprises a front substantially triangular shape with a front extending taper, and a rear substantially triangular shape with a rear extending taper. Located along edges of the structure 92 are flanges 98 for facilitating attachment of the two sections together. The rear triangular shapes flare outward, thereby creating a space between the two rear triangular shapes. An upper closeout 100 is attached by an attachment means to upper edges of the left and right front triangular shapes, and a lower closeout 102 is attached by the attachment means 32 to lower edges of the left and right triangular shapes. When the upper and lower closeouts 100,102 are attached, a box structure is created of the two front triangular shapes. Attached to an inner surface of the right rear triangular shape 104 is a right inner triangular section 108, and attached to an inner surface of the left rear triangular shape 106 is a left inner triangular section 110. When the two inner triangular sections 108,110 are attached, two independent triangular shaped structures are created, each of which extends rearward and outward from the front triangular structure. A front end of the front structure interfaces with a head tube bracket 112 that is attached to the front end by the attachment means 32, as shown in FIG. 5. Located substantially where the two rear triangular structures meet the front triangular box structure is an interface with a lower bracket 122 and seatpost 114, with the seatpost extending upward through openings on the lower surface and upper surface/upper closeout. Extending rearward from the right rear triangular structure is a right dropout 124, and extending rearward from the left rear triangular structure is a left dropout 126. The alternate design of the BBBS 10 is also utilized in combination with bicycle components to function as a frame for a bicycle.

Figure 7:
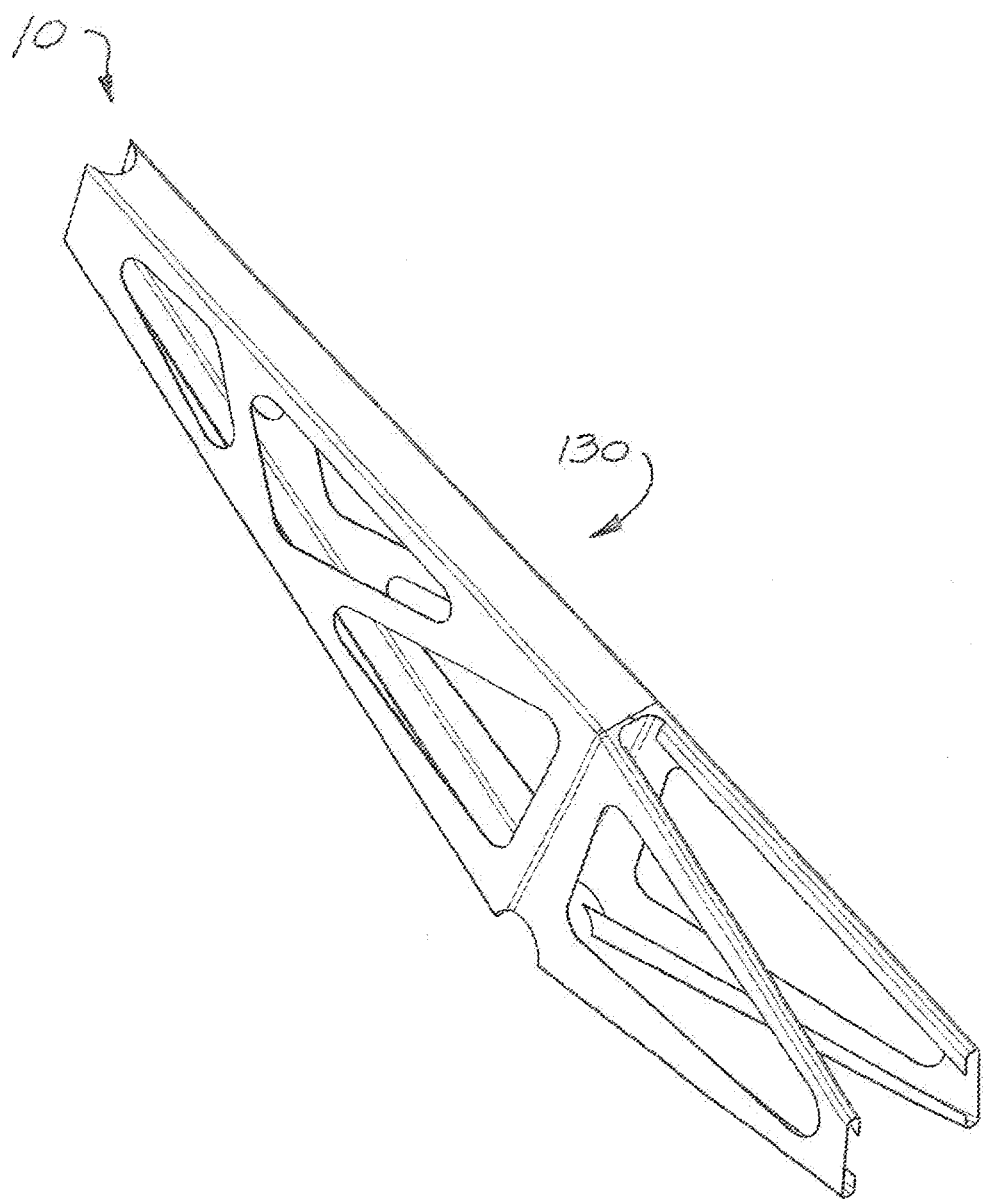
FIG. 7 is an orthographic side view of an alternate design of the BBBS showing a one-piece design.

In another alternate design, the BBBS 10 box structure 12, right triangular section 44 and left triangular section 66 can be manufactured as one piece 130, as shown in FIG. 7. To facilitate the manufacturing of the one piece design 130, a specially constructed, purpose-built brake tool (not shown) is used.

Figure 11:
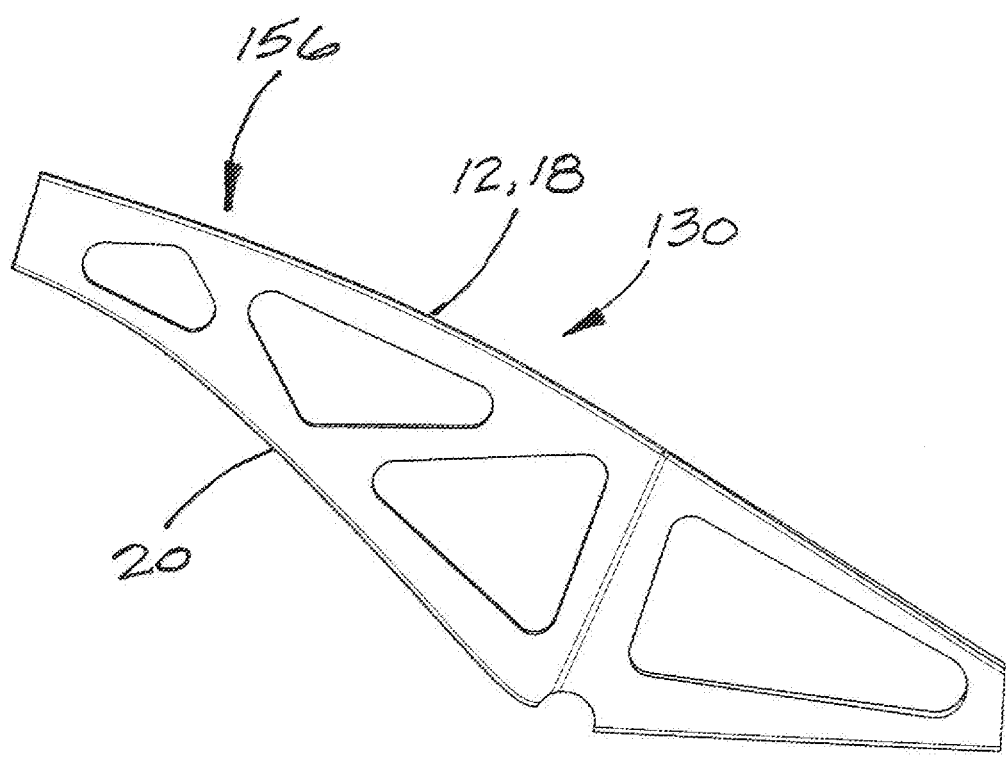
FIG. 11 is an elevational side view of the one-piece design of the BBBS with a curved box structure.

As shown in FIG. 11, the one-piece design 130 of the BBBS 10 can have a box structure 12 with a curved design 156 in which the upper section 18 tapers downward toward the front end 22, and the lower section 20 tapers upward toward the front end 22. Although the curved box structure 156 is primary used for the one-piece design 130, it can also be utilized on the other designs. When the curved design 156 is utilized, the box structure 12 is preferably hydroformed or stretch formed. Hydroforming is a specialized type of die forming that uses a high pressure hydraulic fluid to press a material into a die. Hydroformed parts typically have a higher stiffness-to-weight ratio than traditional stamped or stamped and welded parts. Stretch forming is a common tensile shaping process for manufacturing components or parts.

Figure 8:
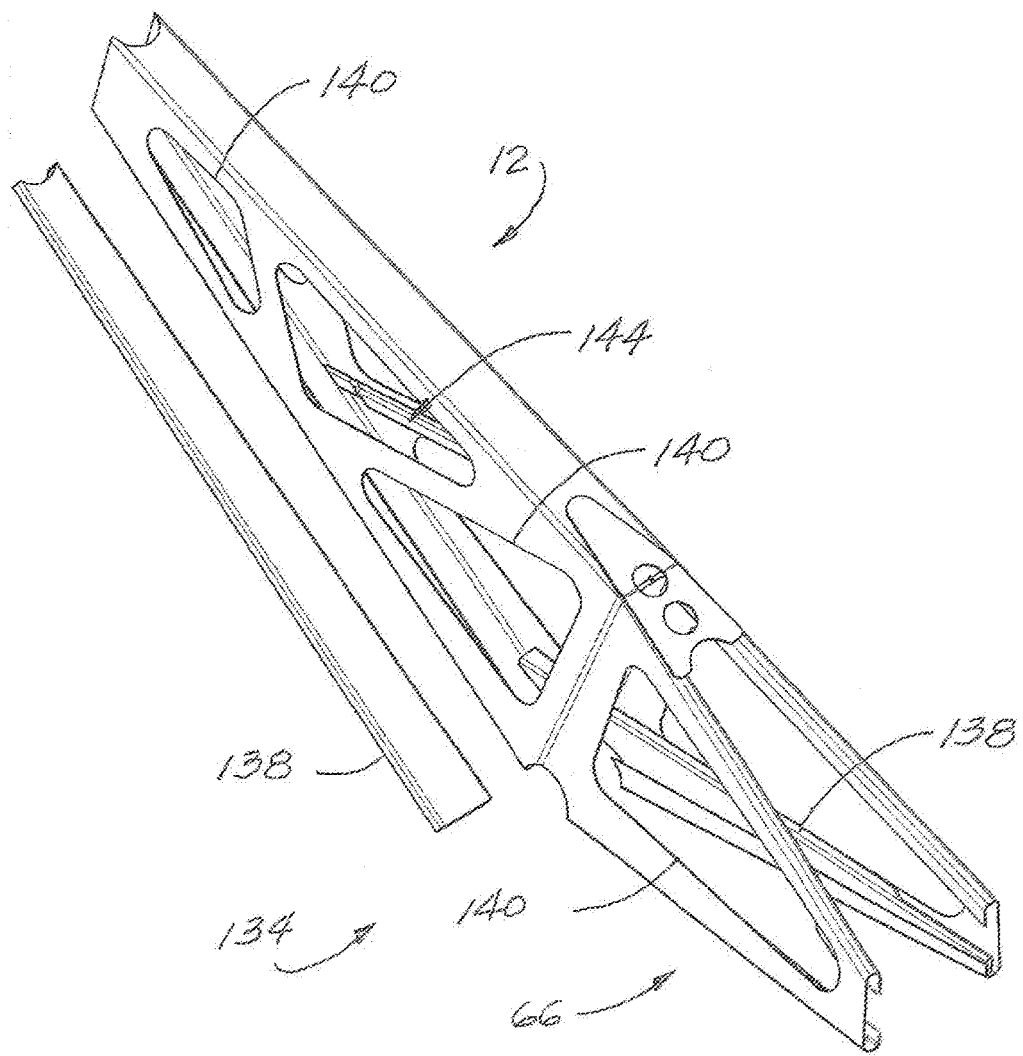
FIG. 8 is an exploded orthographic side view of an alternate design of the BBBS showing a hybrid construction design.
Figure 9:
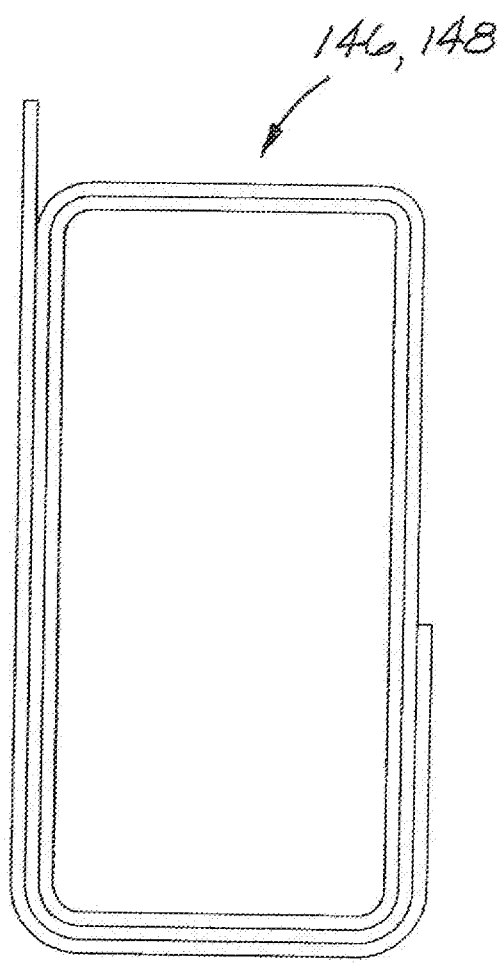
FIG. 9 is a cross-sectional view of a reinforcing method comprising fiberglass, metal or a composite material.
Figure 10:
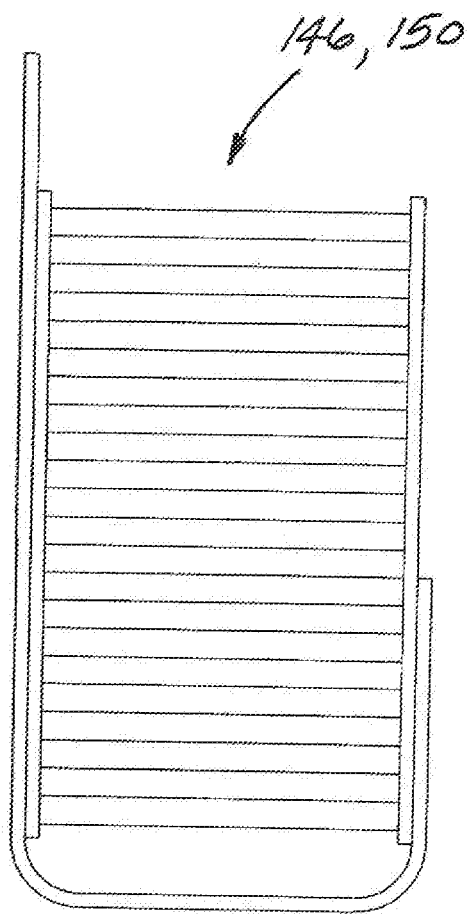
FIG. 10 is a cross-sectional view of a reinforcing method comprising metal over honeycomb.

A further alternate design comprises a hybrid construction design (HCD) 134, as shown in FIG. 8. The HCD 134 primary inventive feature is the inclusion of an internal structure made of fiber reinforced polymer (FRP), aluminum tubing, carbon fiber, honeycomb material, or a combination material comprising two or more of these materials. To strengthen the structure of the HCD 134, reinforcing methods 146 including fiberglass, metal or composite 148, as shown in FIG. 9, or metal over honeycomb 150, as shown in FIG. 10, are utilized. The HCD 134 creates a high-end to facing hybrid metal structure that benefits from the toughness and pleasing appearance of metal and the stiffness, low density and strength inherent to the construction. A typical BBBS 10 assembly HCD 134 includes an aluminum structure having reinforcing members 138 located at various cross sections which strengthen and stiffen the BBBS 10 especially in critical areas. The HCD 134 can be polished or painted or a combination of both, and the designers can choose from an almost infinite variety of shapes for the cut-outs. The reinforcing members 138, which are typically rectangular in cross-section, are located in highly stressed areas or areas subject to buckling such as the side sections. In the case of FRP reinforcements subject to bending loads, most of the FRP fibers are oriented lengthwise or perpendicular to a cross-sectional plane. Where torsional loading is predominate, the reinforcing members 138 are oriented at an angle to maximize strength and stiffness. Alternatively tubing or cut-outs from honeycomb panels can be riveted and bonded to the outer shell to add reinforcement. A truss stiffener 144 can be utilized to prevent the side sections from buckling under stress, and strengthens and stiffens the box structure.

Additionally, other internal reinforcing methods 146 can be used to increase the strength and structural integrity. As previously disclosed, the reinforcing methods 146 include, but are not limited to, fiberglass, metal or a composite material 148, as shown in FIG. 9, or metal over honeycomb 150, as shown in FIG. 10.

It should be noted, that the materials and attachment means disclosed herein are only predominant examples. There are other current materials and attachment means, as well as yet not developed materials and attachment means, that could be utilized and function with equal efficacy.

While the invention has been described in detail and pictorially shown in the accompanying drawings it is not to be limited to such details, since many changes and modification may be made to the invention without departing from the spirit and the scope thereof. Hence, it is described to cover any and all modifications and forms which may come within the language and scope of the claims.

The invention claimed is:

1. A box beam bicycle structure comprising:
   a) a box structure including a right side section, a left side section, an upper section, a lower section, a front end having a vertical semi-circular channel, and a rear end having a horizontal semi-circular channel, wherein said box structure has a substantially rectangular shape having the upper section tapering downward toward the front end, and the lower section tapering upward toward the front end,
   b) a right triangular section including an outer surface, an inner surface, a downward tapering upper edge, a lower edge, a front end, and a rear end, wherein said right triangular section extends rearward and outward from the rear end of said box structure, with said triangular section's upper edge tapering downward, and the lower edge tapering upward, and
   c) a left triangular section including an outer surface, an inner surface, an upper edge, a lower edge, a front end, and a rear end, wherein said left triangular section extends rearward and outward from the rear end of said box structure, with said triangular section's upper edge tapering downward, and the lower edge tapering upward, wherein said two triangular sections having a space therebetween and at a location where the respective front ends of said triangular sections interface with the rear end of said box structure, a vertical U-shaped channel is formed, wherein the vertical semi-circular channel at said box structure's front end interfaces with a bicycle head tube, the horizontal semi-circular channel located on the lower section adjacent said box structure's rear end interfaces with a bicycle lower/seat bracket, the right triangular section's rear end interfaces with a bicycle right dropout, and the left triangular section's rear end interfaces with a bicycle left dropout, wherein in combination with the interfacing of the bicycle components, said BBBS functions as a frame for a bicycle.

2. The BBBS as specified in claim 1 wherein said BBBS is made of a material selected from the group consisting of a sheet material, carbon fiber, fiberglass, plastic or a composite material.

3. The BBBS as specified in claim 1 wherein said sheet material is selected from the group consisting of aluminum alloy, a metal matrix composite, titanium, a fiber reinforced polymer, a ferrous alloy, a magnesium alloy, or a honeycomb material.

4. The BBBS as specified in claim 1 wherein the sections of said box structure are attached together by an attachment means selected from the group consisting of riveting, bonding or welding.

5. The as specified in claim 1 wherein said box structure and said two triangular sections are integral.

6. The as specified in claim 1 wherein said two triangular sections are attached by attachment means to said box structure.

7. The BBBS as specified in claim 6 wherein the attachment means are selected from the group consisting of riveting, bonding or welding.

8. The as specified in claim 1 wherein said head tube, said bottom bracket and said rear drop-outs are welded, bonded or braised to said sheet material.

9. The BBBS as specified in claim 1 wherein said box structure, said right triangular section, and said left triangular section each further comprises at least one weight reducing opening, wherein the opening on said right triangular section is comprised of a chain slot that is dimensioned to accept a bicycle chain.

10. The BBBS as specified in claim 1 wherein said box structure further comprises a core material that is located within said structure, and that increases the rigidity of said BBBS wherein the core material is selected from the group consisting of a honeycomb material, rigid foam, a composite fiber material, or balsa, wood.

11. The BBBS as specified in claim 1 further comprising at least one gusset at locations of higher stress.

12. The BBBS as specified in claim 1 wherein said box structure and said two triangular sections are manufactured as one-piece.

13. The BBBS as specified in claim 12 wherein said box structure having a curved design with an upper section that tapers downward toward said front end, and a lower section that tapers upward toward said front end.

14. The BBBS as specified in claim 12 wherein said box structure further comprises reinforcing means that are selected from the group consisting of fiberglass, metal or a composite material, or metal over honeycomb.

15. The BBBS as specified in claim 1 wherein said BBBS further comprises a hybrid construction design utilizing an internal structure of fiber reinforced polymer (FRP), aluminum tubing, an alloy, carbon, fiberglass, honeycomb material, or a combination material comprising at least two of FRP, aluminum tubing and a honeycomb material, thereby producing a hybrid metal structure with the strength and appearance of metal, and the stiffness, low density and structural integrity of the FRP, aluminum tubing, alloy, carbon, fiberglass or honeycomb material or combination thereof.

16. The BBBS as specified in claim 15 wherein said hybrid construction design comprises reinforcing members that are located at high stress areas or areas that are subject to buckling, wherein at high stress areas subject to bending loads said members are oriented lengthwise or perpendicular to a cross-sectional plane, wherein at high stress areas subject to torsional loading said members are oriented at an angled to maximize strength and stiffness.

17. The BBBS as specified in claim 16 wherein the high stress areas or areas that are subject to buckling are selected from the group consisting of the head tube, bottom bracket rear drop-out, connection, and seat tube.

18. The BBBS as specified in claim 15 wherein said hybrid construction design comprises at least one truss stiffener that prevents the side sections from buckling under stress, and strengthens and stiffens said box structure, wherein a serrated metal plate is utilized to clamp at least one stiffener to said BBBS during a bonding process, and using attachment means to improve securement.

19. The BBBS as specified in claim 15 wherein said hybrid construction design facilitates the inclusion of multiple cut-outs, with each cut-out having any geometric or non-geometric shape.

20. The BBBS as specified in claim 15 wherein said BBBS is polished or painted, or a combination of polishing and painting.

21. A box beam bicycle structure comprising a geometric structure with a right section and a left section, wherein said right section and left section comprises a front substantially triangular shape with a front extending taper, wherein located along edges of said structure are flanges for facilitating attachment of the right and left sections together, wherein an upper closeout is attached by attachment means to the upper edges of said left and right front triangular sections, and a lower closeout is attached by attachment means to the lower edges of said left and right triangular front sections, wherein when the upper and lower closeouts are attached, a box structure is created of the two front triangular sections, wherein attached to a rear edge of said box structure are right and left rear triangular shapes, wherein attached to an inner surface of said right rear triangular shape is a right inner triangular section, and attached to an inner surface of said left rear triangular shape is a left inner triangular section, wherein when the two inner triangular sections are attached, two independent triangular shaped structures that extend rearward and outward from said front triangular box structure are created, with a space between the two triangular structures, wherein located on either the left or right triangular section is an opening that is dimensioned for a bicycle drive system, wherein a front end of said box structure interfaces with a head tube bracket that is attached to the front end by attachment means, wherein located substantially where said two rear triangular structures meet the front triangular box structure is an interface with a lower bracket and a seat tube, with the seat tube extending upward through openings on the lower surface and upper surface/upper closeout, wherein extending rearward from the right rear triangular structure is a right dropout, and extending rearward from the left rear triangular structure is a left dropout, wherein the BBBS is utilized in combination with bicycle components to function as a frame for a bicycle.

* * * * *